(12) United States Patent
Semsey

(10) Patent No.: US 8,069,962 B1
(45) Date of Patent: Dec. 6, 2011

(54) ELECTROMECHANICAL BRAKE COMPRISING AN ENERGY ACCUMULATOR AND A DOWNSTREAM FORCE MULTIPLICATION UNIT

(75) Inventor: Akos Semsey, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 615 days.

(21) Appl. No.: 12/089,869

(22) PCT Filed: Sep. 6, 2006

(86) PCT No.: PCT/EP2006/066083
§ 371 (c)(1),
(2), (4) Date: Sep. 15, 2008

(87) PCT Pub. No.: WO2007/042358
PCT Pub. Date: Apr. 19, 2007

(30) Foreign Application Priority Data

Oct. 12, 2005 (DE) .......................... 10 2005 048 884

(51) Int. Cl.
*F16D 65/56* (2006.01)
(52) U.S. Cl. ..................................... 188/72.9; 188/72.8
(58) Field of Classification Search ........ 188/72.7–72.9, 188/167
See application file for complete search history.

(56) References Cited

U.S. PATENT DOCUMENTS

| | | | | |
|---|---|---|---|---|
| 5,501,305 | A * | 3/1996 | Stalmeir et al. | 188/167 |
| 6,662,908 | B2 * | 12/2003 | Gradert et al. | 188/72.9 |
| 6,845,853 | B2 * | 1/2005 | Baumann et al. | 188/72.9 |
| 2003/0034212 | A1 | 2/2003 | Gradert et al. | 188/167 |
| 2004/0026187 | A1 * | 2/2004 | Murayama | 188/72.7 |
| 2005/0145449 | A1 * | 7/2005 | Jelley et al. | 188/72.7 |
| 2005/0167212 | A1 * | 8/2005 | Pascucci et al. | 188/72.2 |
| 2005/0173206 | A1 * | 8/2005 | Reuter et al. | 188/72.7 |

FOREIGN PATENT DOCUMENTS

| | | |
|---|---|---|
| DE | 198 19 654 A1 | 5/1999 |
| DE | 101 40 075 A1 | 2/2003 |
| WO | WO 02/25136 A1 | 3/2002 |

OTHER PUBLICATIONS

Chinese Office Action, Chinese application No. 200680045752.3, 2 pages, Dec. 10, 2009.

* cited by examiner

*Primary Examiner* — Christopher Schwartz
(74) *Attorney, Agent, or Firm* — King & Spalding L.L.P.

(57) ABSTRACT

An electromechanical brake has an element to be braked, at least one friction lining for frictionally engaging with the element, and an electric actuator for displacing the friction lining so that it frictionally engages with the element. A constructively and energetically improved electromechanical brake can be provided by a reversible energy accumulator functionally coupled to the electric actuator which interacts with a force multiplication device such that when the brake is actuated by the actuator, the stored energy is successively supplied to the force multiplication device with increasing actuation travel of the actuator and the device converts the energy in a set manner to an actuation torque that increases with increasing actuation travel of the actuator, the torque being transmitted indirectly or directly onto the friction lining. When the brake is released, a brake-inherent restoring force reacting upon the force multiplication device via the friction lining recharges the energy accumulator.

20 Claims, 1 Drawing Sheet

ELECTROMECHANICAL BRAKE COMPRISING AN ENERGY ACCUMULATOR AND A DOWNSTREAM FORCE MULTIPLICATION UNIT

CROSS-REFERENCE TO RELATED APPLICATIONS

This application is a U.S. national stage application of International Application No. PCT/EP2006/066083 filed Sep. 6, 2006, which designates the United States of America, and claims priority to German application number 10 2005 048 884.6 filed Oct. 12, 2005, the contents of which are hereby incorporated by reference in their entirety.

TECHNICAL FIELD

The invention relates to an electromechanical brake which is designed in particular, but not exclusively, for use in vehicles.

BACKGROUND

Electromechanical brakes differ from the hydraulic or pneumatic brakes widely used in the motor vehicle field in that the brake application force is not generated hydraulically or pneumatically but by electromechanical means.

The first generation of electromechanical motor vehicle brakes attempted to produce the considerable brake application force necessary by means of an electric motor on each wheel brake, generally with a downstream reduction gear mechanism, in order to limit the size and therefore the weight of the electric motor. However, the in some cases very high reduction ratios selected in the order of 1:200 greatly impaired the dynamic behavior of the brake, which made such solutions appear unsatisfactory overall. Consequently, solutions of this kind have as yet never gone into commercial production.

Electromechanical brakes with self-energization are much more promising, as this type of electromechanical brake only requires a relatively small electric actuator and derives most of the brake application force from the kinetic energy of the moving brake element to be decelerated, e.g. from a brake disk as it rotates during vehicle operation. The basic operating principle of such electromechanical brakes with self-energization is described in German patent 198 19 654. However, because of this operating principle, high brake application forces can only be achieved when a vehicle in which such an electromechanical brake with self-energization is installed is moving.

SUMMARY

The requirement therefore still exists for an electromechanical brake which requires only a small electric actuator in order to achieve high brake application forces both during movement e.g. of a vehicle and when stationary, i.e. irrespective of whether or not the brake element to be decelerated is moving, and also independently of the direction (of rotation) of said element. General advantages of electromechanical motor vehicle brakes are ease of installation during vehicle manufacture (hydraulic lines no longer required) and problem-free incorporation into the electronic control systems required for controlling and operating the brake (driver assistance functions such as ABS, ESC, EBD, LSD etc. can be implemented without expensive electromagnetic valves).

According to an embodiment, an electromechanical brake may comprise an element to be decelerated, at least one friction lining for frictional engagement with the element to be decelerated, an electric actuator for moving the friction lining into frictional engagement with the element to be decelerated, and a reversible accumulator operatively linked to the electric actuator and acting in conjunction with a force multiplication device such that when the brake is applied by means of the actuator, the energy stored in the accumulator is successively delivered to the force multiplication device as the actuator travel increases and is converted by said device into an actuating torque which is transmitted indirectly or directly to the friction lining, the actuating torque increasing in a predefined manner as the actuator travel increases, and that when the brake is released, a brake-inherent restoring force retroacting on the force multiplication device via the friction lining recharges the accumulator.

According to a further embodiment, the accumulator can be completely or almost completely emptied when the electric actuator has reached its maximum travel. According to a further embodiment, the brake-inherent restoring force may result from the elastic deformation of the brake components involved in a brake application. According to a further embodiment, the increase in the actuating torque predefined via the actuator travel may compensate at least approximately the brake-inherent restoring force which increases with actuator travel. According to a further embodiment, the brake-inherent restoring force which increases with the actuator travel can be undercompensated. According to a further embodiment, the brake-inherent restoring force which increases with the actuator travel can also be overcompensated. According to a further embodiment, the force multiplication device may be a gear mechanism. According to a further embodiment, the element to be decelerated may be a brake disk. According to a further embodiment, the accumulator may be a compressed spring. According to a further embodiment, the spring may be a disk spring whose delivered actuating torque increases with increasing actuator travel. According to a further embodiment, the brake may be a floating caliper partially lined disk brake.

BRIEF DESCRIPTION OF THE DRAWINGS

An exemplary embodiment of the electromechanical brake will now be explained in greater detail with reference to the accompanying schematic drawings in which.

DETAILED DESCRIPTION

Figure 1:
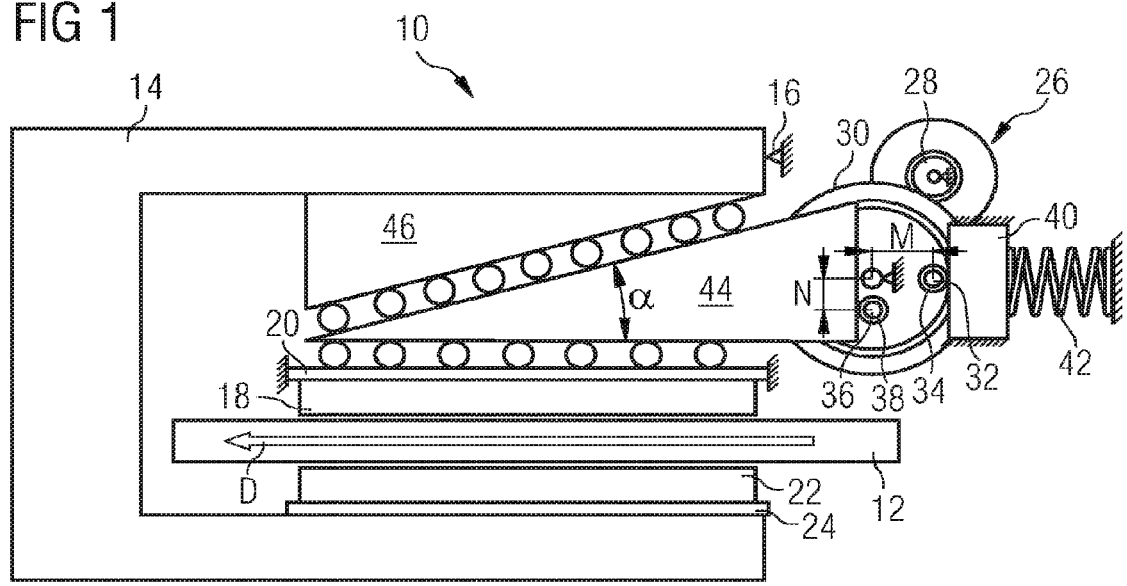
FIG. 1 shows a schematic of an electromechanical brake according to an embodiment, implemented as a floating caliper partially lined disk brake for a motor vehicle.

As stated above, according to an embodiment, an electromechanical brake may comprise an element to be decelerated, at least one friction lining for frictional engagement with the element to be decelerated, and an electric actuator for moving the friction lining into frictional engagement with the element to be decelerated, and a reversible accumulator which is operatively linked to the electric actuator and acting in conjunction with a force multiplication device such that when the brake is being applied by means of the actuator, the energy stored in the accumulator is successively delivered to the force multiplication device as the actuator travel increases and is converted by said device into an actuating torque which is transmitted indirectly or directly to the friction lining, the actuating torque increasing in a predefined manner as the actuator travel increases, and that when the brake is released, a brake-inherent restoring force retroacting on the force multiplication device via the friction lining recharges the accumulator.

Thus, the required brake application force or more specifically the required brake actuating torque is covered essentially using the energy stored in the accumulator and to let the electric actuator contribute only a small portion compared to the required brake application force or rather the required brake actuating torque. In this context, "reversible accumulator operatively linked to the electric actuator" is to be understood as meaning that when the electric actuator is operated the accumulator automatically also delivers to the force multiplication device a force corresponding to the degree of actuation of the actuator. The force applied to the force multiplication device, made up of the portion of the force coming from the accumulator and the portion of the force contributed by the electric actuator, is "boosted" by the force multiplication device by converting this force into an actuating torque which is then transferred to the friction lining in order to press the latter against the element to be decelerated, the force multiplication device being designed, e.g. by means of a variable lever arm, such that the actuating torque increases with increasing actuator travel in order to take account of the increased braking requirements associated with the increasing actuator travel. The force multiplication device therefore ensures that, in spite of the essentially constant input force provided by the combined effect of the accumulator and electric actuator, the output actuating torque transmitted by the force multiplication device to the friction lining increases as the actuator travel increases, without the actuator needing to increase its application force significantly, "actuating torque increasing in a predefined manner" meaning that a particular desired output actuating torque characteristic can be specified by appropriate design of the force multiplication device. Such a characteristic can be linearly increasing, but can also be progressive or degressive. By "brake-inherent restoring force" is meant that each brake, when applied, builds up a force which is opposed to the application force and is used according to an embodiment to recharge the accumulator when the brake is released so that energy for a new braking operation is available in the accumulator.

The electromechanical brake according to an embodiment is preferably designed such that its accumulator is completely or almost completely emptied when the electric actuator has attained its maximum travel. Although it would likewise be possible to operate the accumulator at levels of between 100% and e.g. 50% of the energy stored therein, complete or virtually complete emptying of the actuator at maximum brake application is more favorable for energy efficiency reasons. However, energy favorable operation of this kind requires relatively high force multiplication by the force multiplication device in the maximum travel region of the actuator in order to be able to achieve the high brake actuating torque then required.

In embodiments of the electromechanical brake, the brake-inherent restoring force results from an elastic deformation of the brake components involved in the brake application, e.g. compression of the friction lining, opening-out of a caliper in the case of a caliper-type electromechanical brake, etc. The electromechanical brake itself consequently behaves like a spring which is loaded during a brake application and unloaded again when the brake is released, the unloading process being used to recharge the accumulator.

The increase in actuating torque predefined via the actuator travel by means of the variable lever arm of the force multiplication device preferably compensates at least approximately the brake-inherent restoring force which increases with actuator travel. For the electric actuator this means that, over its entire travel, it only needs to be able to deliver an application force that is small compared to the total required brake application force or more specifically the total required brake actuating torque. The electric actuator can therefore be of light and compact design.

In various embodiments of the electromechanical brake, the predefined increase in the actuating torque is selected such that the brake-inherent restoring force which increases with actuator travel is undercompensated, which means that the electric actuator must contribute a particular amount of force in the application direction in order to achieve the desired braking effect. If in the case of an electromechanical brake designed in this way the electric actuator fails, the brake must of necessity fall back to its unapplied, open state. Other embodiments are designed such that the brake-inherent restoring force which increases with actuator travel is overcompensated, which during normal braking means that the electric actuator must contribute a certain amount of force contrary to the brake application direction, so that in total (only) the desired braking effect is achieved. If in such an example the electric actuator fails, the electromechanical brake automatically assumes a closed, i.e. braking state. A design of this kind is legally required for particular applications, e.g. for truck brakes.

In all the exemplary embodiments of the brake, the force multiplication device is preferably a gear mechanism with variable lever arm, i.e. a lever arm which becomes longer as the actuator travel increases. Any kind of gear mechanism meeting the above requirements can be employed.

The brake element to be decelerated can be a rotating element, e.g. a brake disk or brake drum, but can also be a linear element between which and the brake a relative movement takes place.

Particularly suitable as accumulators for the electromechanical brake according to various embodiments are compressed springs which can be used individually or as a spring assembly. There also exist springs which already have a force multiplication device, so to speak, built-in, e.g. disk or diaphragm springs of the type currently used in motor vehicle clutches. Such springs already exhibit (due e.g. to their special geometry) the desired behavior of an actuating torque that increases with increasing actuator travel.

According to an embodiment, the electromechanical brake can be a floating caliper partially lined disk brake for a motor vehicle.

FIG. 1 schematically illustrates the design of an exemplary embodiment of an electromechanical brake 10 which is implemented here as a floating caliper partially lined disk brake for a motor vehicle.

The brake 10 has a rotating brake disk 12 which during normal operation of the brake is fixedly connected to the wheel of a vehicle (not shown). An arrow D indicates the main direction of rotation of the brake disk 12 during operation, i.e. the direction of rotation for forward drive.

The brake disk 12 is spanned by a floating caliper 14 which is displaceably attached parallel with the axis of rotation (not shown) of the brake disk 12 to a brake shield 16 (only shown in outline here) which in the installed state of the brake 10 is connected to a fixed vehicle component, usually part of the wheel suspension. In the brake shield 16, a first friction lining 18 is carried by means of a first backing plate 20 to which the friction lining 18 is fixedly connected, such that it can be moved toward and away from the brake disk 12. Opposite the friction lining 18 there is disposed on the other side of the brake disk 12 a second friction lining 22 which is attached to the floating caliper 14 by means of an associated backing plate 24.

To apply the brake 10, an electric actuator 26, e.g. an electric motor, is used which is capable of rotating an externally toothed disk 30 pivotally mounted in the brake shield 16 via a drive pinion 28.

On the disk 30 is attached a first pin 32 on which a first sleeve 34 is pivotally mounted. Also attached to the disk 30 is a second pin 36 on which a second sleeve 38 is pivotally mounted. A distance M between the center of the first pin 32 and the axis of rotation of the disk 30 is greater than a distance N between the center of the second pin 36 and the axis of rotation of the disk 30.

The first pin 32 is in contact via its sleeve 34 with one side of a displaceably guided plunger 40 on the other side of which a pressure spring 42 acts which is in a compressed state at least in the initial state of the brake 10 as shown in FIG. 1. The second pin 36 is in contact via its sleeve 38 with an actuating wedge 44 which is mounted such that it can move to and from relative to the first friction lining 18, or more precisely its backing plate 20, parallel to the brake disk 12. The actuating wedge 44 is likewise supported in a displaceably mounted manner, forming a wedge angle α, against a counter bearing 46 which is attached to the floating caliper 14.

The operation of the brake 10 will now be explained in greater detail. In order to execute a braking operation, the two friction linings 18, 22 must be moved into contact with the brake disk 12. For this purpose the electric actuator 26 must rotate its drive pinion 28 counterclockwise, thereby applying a first actuating torque to the disk 30 which then begins to rotate in a clockwise direction. Said first actuating torque acts on the actuating wedge 44 via the second pin 36 or more specifically the sleeve 38 pivotally mounted thereon. Before the disk 30 rotates, the center of the first pin 32 is on the line, intersecting the axis of rotation of the disk 30, of the force which the spring 42 exerts on the first pin 32 via the plunger 40 (initial state). In said initial state, the spring 42 exerts no actuating torque on the actuating wedge 44, as the lever arm of the spring force is zero with respect to the actuating wedge 44 in this initial state.

However, the clockwise rotation of the disk 30 initiated by the first actuating torque causes the center of the first pin 32 to move away from the line of force of the spring 42 (downward in FIG. 1), so that a second actuating torque is now produced whose magnitude results from the spring force acting on the plunger 40 and the length of the rotation-generated lever arm between the line of force of the spring and the center of the first pin 32. Like the first actuating torque generated by the electric actuator 26, the second actuating torque also acts on the actuating wedge 44 via the second pin 36, or more precisely via its sleeve 38. A total actuating torque produced by adding together the first actuating torque and the second actuating torque therefore acts on the actuating wedge 44. Initiated by its accompanying rotation of the disk 30, the total actuating torque displaces the actuating wedge 44 in FIG. 1 to the left, causing the actuating wedge 44, because it is supported against the counter bearing 46 at a wedge angle α, to simultaneously press the first friction lining 18 against the brake disk 12. Due to the resulting reaction forces well known to persons skilled in the relevant art, the floating caliper 14 is displaced parallel to the axis of rotation of the brake disk 12, thereby ensuring that the second friction lining 22 is also pressed against the brake disk 12.

With increasing total actuating torque, particular components of the brake 10, in particular the two friction linings 18 and 22 and the floating caliper 14, behave like a spring which is increasingly loaded, as the material of the friction linings 18, 22 is compressed by the forces exerted and the floating caliper 14 opens up elastically. A brake-inherent restoring force is therefore produced which counteracts the brake application force or more specifically the brake actuating torque and which must be overcome in order to produce a braking operation. Obviously this brake-inherent restoring force is increased the greater the total actuating torque of the brake, which can only mean that, to achieve an increasing braking force a likewise increasing total actuating torque must be provided.

In the brake 10 illustrated, the increasing total actuating torque required for increasing braking force is produced in an elegant and energetically very advantageous manner by the force of the spring 42 which acts on the actuating wedge 44 via the plunger 40 and the unit constituting a force multiplication device comprising a disk 30, first pin 32 and second pin 36. With increasing clockwise rotation angle of the disk 30, the lever arm present between the center of the first pin 32 and the line of effective force of the spring 42 increases to up to the maximum lever arm M which is achieved at a rotation of the disk 30 through 90° compared to the initial state, while simultaneously the lever arm created between the center of the second pin 36 and the axis of rotation of the disk 30 continuously falls from its maximum value N present in the initial state of the brake 10 and then reaches a zero value when the disk 30 has rotated clockwise through 90 degrees. In other words, the force multiplication ratio of the force multiplication device continuously increases during clockwise rotation of the disk 30 and at least theoretically attains the value infinity when the disk 30 has rotated through 90 degrees. In this way the force of the spring 42 provides the largest part of the actuating torque required, while the electric actuator 26 needs to contribute only a small part of the actuating torque required. The spring 42 used as an accumulator is designed such that it is completely or in any case almost completely unloaded at maximum force multiplication of the force multiplication device, i.e. in the present case when the disk 30 has rotated through 90 degrees from its initial state.

Figure 2:
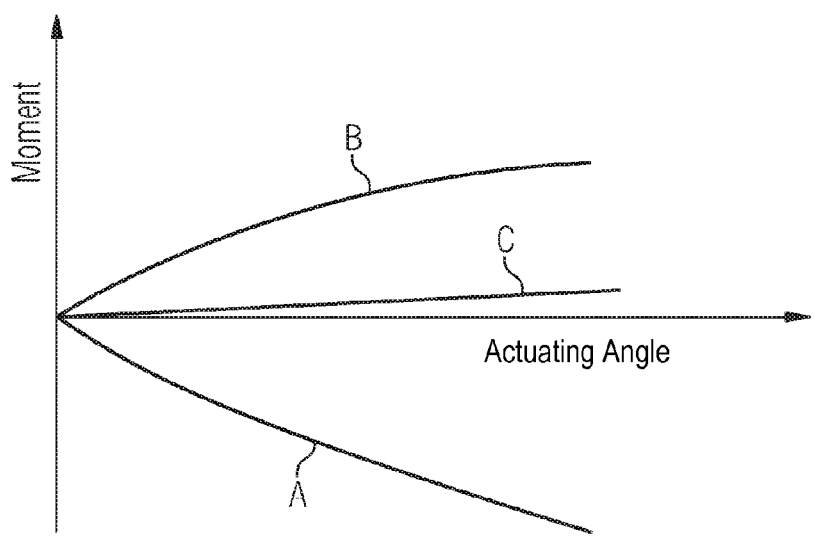
FIG. 2 shows a torque-actuating angle diagram illustrating a typical characteristic of forces at play in the example shown in FIG. 1.

To illustrate the actuating torque characteristics described, reference is made to FIG. 2 which shows a graph in which the individual torques are plotted against the actuating angle of the actuator, or more precisely of the disk 30, a first curve A showing the response of the brake-inherent restoring force building up during a brake application with increasing actuator travel or more specifically the restoring torque resulting from this force. As this restoring torque is in opposition to the actuating torque, it has a negative sign. A curve B shows the response of the actuating torque exerted by means of the force of the spring 42 and the downstream force multiplication device, i.e. the torque referred to above as the second actuating torque. In absolute value terms, this second actuating torque is smaller throughout than the restoring torque according to curve A. A curve C illustrates the response of the actuating torque provided by the electric actuator 26 via the actuating angle, i.e. the torque referred to above as the first actuating torque. For a given actuating angle, the sum of the first and second actuating torque produces an absolute value corresponding to the associated value of the restoring torque. It may be seen that the actuating torque provided by the electric actuator 26 is in each case small compared to the actuating torque produced by means of the force of the spring 42. The electric actuator 26 can therefore be of small and light design.

The force behavior shown in FIG. 2 is merely by way of example and can be modified by a different design of the accumulator and/or downstream force multiplication device so as to be maximally advantageous for a given use. While an exemplary embodiment has been described above wherein the electric actuator 26 contributes a lesser portion of the total actuating torque, in other examples it can be provided that the actuating torque resulting from the accumulator and downstream force multiplication device overcompensates the restoring torque resulting from the brake-inherent restoring force, so that in order to control the braking operation the electric actuator must apply a torque which is opposed to the actuating torque exerted by means of the accumulator and downstream force multiplication device. It shall likewise be understood that, instead of the force multiplication device illustrated and described, any other force multiplication device can be used which provides the desired force multiplication that can be varied via the actuator travel. The actuation of the first friction lining 18 is also not limited to the solution shown in which an actuating wedge 44 is used, but other devices for actuating the friction lining(s) can be provided instead. The force multiplication device can also act directly on a friction lining.

When the brake 10 is released, the described brake-inherent restoring force or more specifically the restoring torque resulting from this force causes the above described processes occurring during a brake application to be reversed, i.e. the actuating wedge 44 moves to the right, parallel to the brake disk 12 in FIG. 1, the disk 30 rotates counterclockwise back to its initial position shown in FIG. 1, and the spring 42 is simultaneously compressed or "charged" again in order to be able to make force available for a new brake application. The loading and unloading of the spring 42 is therefore reversible, electrical energy is therefore only consumed for a relatively small part of the total actuating torque which the electric actuator 26 must apply either in the actuating direction or against the actuating direction.

The invention claimed is:

1. An electromechanical brake comprising
an element to be decelerated,
at least one friction lining for frictional engagement with the element to be decelerated,
an electric actuator for moving the friction lining into frictional engagement with the element to be decelerated,
a reversible accumulator operatively linked to the electric actuator and acting in conjunction with a force multiplication device such that when the brake is applied by means of the actuator, the energy stored in the accumulator is successively delivered to the force multiplication device as the actuator travel increases in a braking direction and is applied to a moment arm to create an actuating torque which is transmitted to the friction lining, the moment arm increases as the actuator travel increases in the braking direction such that the actuating torque created by the application of the accumulator energy to the moment arm increases in a predefined manner as the actuator travel increases in the braking direction, and that when the brake is released, a brake-inherent restoring force retroacting on the force multiplication device via the friction lining recharges the accumulator.

2. The electromechanical brake according to claim 1, wherein the brake-inherent restoring force results from the elastic deformation of the brake components involved in a brake application.

3. The electromechanical brake according to claim 2, wherein the increase in the actuating torque predefined via the actuator travel compensates at least approximately the brake-inherent restoring force which increases with actuator travel.

4. The electromechanical brake according to claim 3, wherein the brake-inherent restoring force which increases with the actuator travel is greater than the actuating torque provided by the accumulator.

5. The electromechanical brake according to claim 3, wherein the brake-inherent restoring force which increases with the actuator travel is less than the actuating torque provided by the accumulator.

6. The electromechanical brake according to claim 1, wherein the accumulator is a compressed spring.

7. The electromechanical brake according to claim 6, wherein the spring is a disk spring whose delivered actuating torque increases with increasing actuator travel.

8. The electromechanical brake according to claim 1, wherein the accumulator is completely or almost completely emptied when the electric actuator has reached its maximum travel.

9. The electromechanical brake according to claim 1, wherein the force multiplication device is a gear mechanism.

10. The electromechanical brake according to claim 1, wherein the element to be decelerated is a brake disk.

11. The electromechanical brake according to claim 1, wherein the brake is a floating caliper partially lined disk brake.

12. A method for operating an electromechanical brake comprising the steps of:
moving a friction lining into frictional engagement with an element to be decelerated by an electric actuator,
providing a reversible accumulator operatively linked to the electric actuator and acting in conjunction with a force multiplication device such that when the brake is applied by means of the actuator, the energy stored in the accumulator is successively delivered to the force multiplication device as the actuator travel increases in a braking direction and is applied to a moment arm to create an actuating torque which is transmitted to the friction lining, the moment arm increases as the actuator travel increases in the braking direction such that the actuating torque created by the application of the accumulator energy to the moment arm increases in a predefined manner as the actuator travel increases in the braking direction, and that when the brake is released, a brake-inherent restoring force retroacting on the force multiplication device via the friction lining recharges the accumulator.

13. The method according to claim 12, wherein the brake-inherent restoring force results from the elastic deformation of the brake components involved in a brake application.

14. The method according to claim 13, wherein the increase in the actuating torque predefined via the actuator travel compensates at least approximately the brake-inherent restoring force which increases with actuator travel.

15. The method according to claim 14, wherein the brake-inherent restoring force which increases with the actuator travel is greater than the actuating torque provided by the accumulator.

16. The method according to claim 14, wherein the brake-inherent restoring force which increases with the actuator travel is less than the actuating torque provided by the accumulator.

17. The method according to claim 12, wherein the accumulator is a compressed spring.

18. The method according to claim 17, wherein the spring is a disk spring whose delivered actuating torque increases with increasing actuator travel.

19. The method according to claim 12, wherein the accumulator is completely or almost completely emptied when the electric actuator has reached its maximum travel.

20. The method according to claim 12, wherein the brake is a floating caliper partially lined disk brake.

* * * * *